United States Patent
Mahn, Jr. et al.

(10) Patent No.: US 6,497,934 B1
(45) Date of Patent: Dec. 24, 2002

(54) SEAM TAPE FOR WATER REPELLANT FABRICS

(75) Inventors: John Mahn, Jr., Cincinnati, OH (US); Steven J. Stein, West Caldwell, NJ (US)

(73) Assignee: Specialty Adhesive Film Co., Cleves, OH (US)

( * ) Notice: Subject to any disclaimer, the term of this patent is extended or adjusted under 35 U.S.C. 154(b) by 0 days.

(21) Appl. No.: 09/370,483

(22) Filed: Aug. 9, 1999

(51) Int. Cl.⁷ .................................................. B32B 3/00
(52) U.S. Cl. ...................... 428/57; 428/475.2; 428/480; 428/422; 428/355 CN
(58) Field of Search ................................ 428/422, 480, 428/355 CN, 475.2, 343, 347, 354, 351, 57, 346

(56) References Cited

U.S. PATENT DOCUMENTS

| | | | |
|---|---|---|---|
| 4,194,041 A | * 3/1980 | Gore et al. | 428/315 |
| 4,759,983 A | * 7/1988 | Knutson et al. | 428/343 |
| 4,775,581 A | * 10/1988 | Siniscalchi | 428/286 |
| 4,914,162 A | 4/1990 | Leoni et al. | 525/420.5 |
| 4,916,017 A | * 4/1990 | Nomi et al. | 428/413 |
| 5,162,149 A | 11/1992 | Reaney | 428/315.5 |

OTHER PUBLICATIONS

*Hot Melt Adhesives*, Bostik Product Data 4231.

* cited by examiner

*Primary Examiner*—Daniel Zirker
(74) *Attorney, Agent, or Firm*—Wood, Herron & Evans, LLP

(57) ABSTRACT

A seam tape for waterproof fabrics includes a thermoplastic adhesive layer and bonded to a waterproof film layer. Thermoplastic adhesive layer is preferably a polyamide adhesive having a melt index of at least about 200–400 and a melting temperature less than about 150° C. The waterproof film layer is a high strength thermoplastic material preferably a polyester such as polyethylene terephthalate. The waterproof film layer should have a thickness of from about 0.25 mils up to about 2 mils. This tape can be applied at higher temperatures than prior seam tapes without damaging the waterproof layer. Thus application speeds can be increased and costs reduced. Further this eliminates any need to post treat crossover seams.

3 Claims, 1 Drawing Sheet

SEAM TAPE FOR WATER REPELLANT FABRICS

Waterproof fabric articles such as clothing, tents and like are formed from sections of laminated fabric which are sewn together along seams. In order to prevent water from seeping into the waterproof article it is necessary to form a watertight seal at all seams.

The seams in waterproof articles are generally not only sewn, but are also covered with a waterproof seam tape. These seam tapes generally include a thermoplastic adhesive layer laminated to a waterproof layer. The adhesive adheres to the interior side of the seam and plugs any holes created by the stitching. The waterproof layer prevents the stitching from penetrating the seam tape.

The waterproof layer can be a variety of different materials. For example, Reaney U.S. Pat. No. 5,162,149 discloses a carrier layer formed from a thermoplastic layer bonded to a polytetrafluoroethylene (PTFE) layer. Most commercially available seam tapes use a polyurethane layer. The polyurethane layer may optionally be covered with a nylon tricot layer for appearance purposes.

One such seam tape formally sold by Electro Seal Corporation used a polyamide adhesive layer having a high melt index bonded to a 2 mil thick polyurethane layer.

When these seam tapes are applied they are generally heated by applying extremely hot air in the neighborhood of 600–800° C. to very quickly melt the thermoplastic adhesive. The goal is for the adhesive to soak into the back side of the fabric creating physical adhesion. The product then cools quickly.

The product disclosed in the Reaney patent is particularly expensive and may be relatively rigid. The polyurethane backed seam tapes are used extensively in the industry but have several disadvantages.

When the seam tape is heated and pressure is applied the stitching can force its way through the polyurethane layer. Once it breaks through the polyurethane layer the seam tape loses its waterproof character and the seam in effect fails. To overcome this problem, a thicker layer of polyurethane has been used, and in some applications exceeds 4 mils. This presents an additional problem because the thicker polyurethane layer is too stiff.

Crossover seams present a further problem. A crossover seam refers to the area where two seams meet either as a "T" or "X" junction. Crossover seams generally require special attention. In order to provide a water tight seam at cross overs prior art seam tapes had to be reheated at the crossover after application. This significantly increased expenses. Further, tapes with a polyurethane waterproof layer can be destroyed by this reheating. The stitching in the seams punctures even a thicker polyurethane layer. This is particularly a problem with crossover seams of PTFE based waterproof materials such as Gortex brand fabric. This is less of a problem with crossover seams of polyurethane waterproof fabric because they generally do not require the second heating.

SUMMARY OF THE INVENTION

The present invention is premised on the realization that a drastically improved seam tape is formed from a layer of polyamide thermoplastic adhesive having a high melt index adhered to a thin layer of polyester or a layer of PTFE. Preferably the adhesive layer is a polyamide adhesive having a melt index of at least about 400 at 175° C. and 2,160 gms, a melt viscosity at 200° C. of 2,500–5,000 cps and a molecular weight of 10,000–15,000.

The polyester layer when used is a high molecular weight (greater than 10,000) linear saturated polyester preferably polyethylene terephthalate, polypropylene terephthalate, polybutylene terephthalate or polylcyclohexane-1,4 dimethylene terephthalate having a thickness of less than 2 mils, generally from about 0.25 to about 1 mils in thickness. A fabric layer such as nylon tricot, polyester tricot or polycotton tricot can be bonded to the polyester layer again for appearance and comfort.

The seam tape of the present invention can be applied very quickly to a seam because the particular adhesive melts very quickly and the polyester layer or the PTFE layer retains its strength and is not punctured. Further, once the seam tape is applied, the adhesive sets very quickly providing great strength which reduces the likelihood of failure of the seam. Because of its strength at higher temperatures, even a very thin polyester layer prevents the stitching from penetrating the seam tape during application. This provides an excellent barrier layer which is very difficult to inadvertently penetrate.

Other objects and advantages of the present invention will be further appreciated in light of the following detailed description and drawings in which:

DETAILED DESCRIPTION

Figure 1:
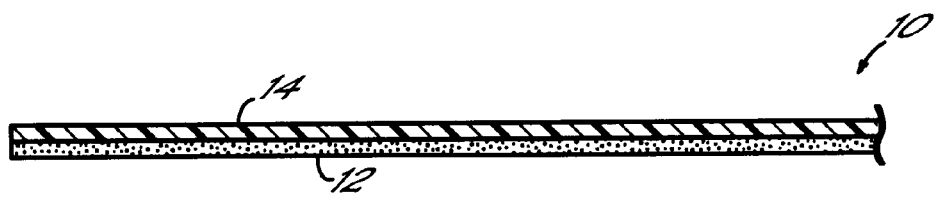
FIG. 1 is a cross-sectional view of seam tape according to the present invention.
Figure 2:
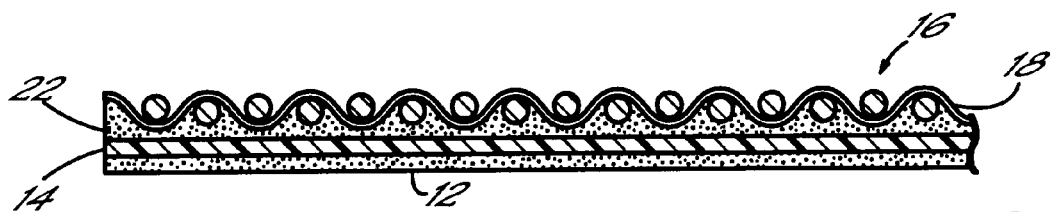
FIG. 2 is a cross-sectional view of an alternate embodiment of the present invention.
Figure 3:
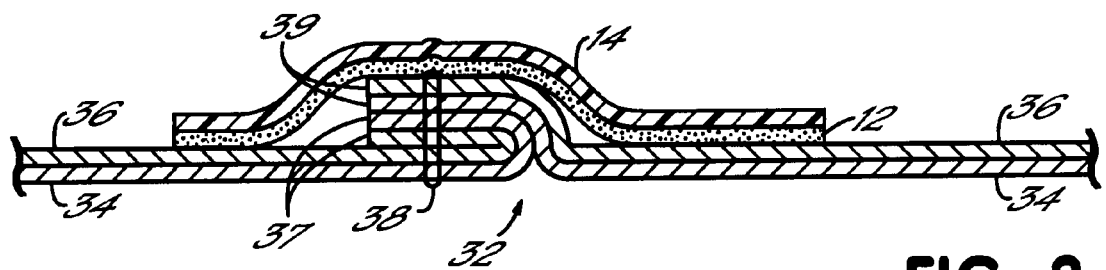
FIG. 3 is a cross-sectional view of the seam tape of FIG. 2 applied to a seam.

The present invention is a seam tape 10 which includes an adhesive layer 12 bonded to a waterproof film layer 14. Alternately as shown in FIG. 2 the seam tape 16 can also include a tricot nylon layer 18 bonded to the waterproof film layer 14 by an adhesive layer 22.

The seam tape is applied over a seam 32 which binds a first piece of material 33 to a second piece of material 35 along overlapping edges 37 and 39 respectively of a garment or tent. The material or fabric includes the outer water repellent layer 34 and an inner layer 36 which is not water repellant. The two sections of cloth are bonded together by stitching 38 which forms the seam.

As shown the seam tape 10 is placed over the seam 32 with the adhesive layer 12 against the inner fabric layer 36. Heat and pressure are applied causing the thermoplastic adhesive 12 to melt and forcing it to flow into the inner fabric layer 36. When the adhesive solidifies, it forms a physical bond to the fabric layer 36. The waterproof film layer 14 being adhered over the seam 32 makes the seam waterproof.

Generally the application temperature will be achieved by directing a blast of hot air (600–800° C.) against the adhesive layer. As an example, the hot air can be applied against the tape at 15 psi with the tape moving at a rate of 15–20 feet per minute. Immediately after being heated, the seam with the seam tape applied thereto is passed through rollers to apply pressure from both sides forcing the adhesive layer 12 into the fabric layer 36. This is then allowed to cool forming the tight seal.

According to the present invention the adhesive layer 12 must have a low melting point generally the melting temperature of the adhesive should be from about 100 to about 140° C. Further, it must have a high-melt index so that it flows very easily once melted. Generally the melt index should be about 100 to about 1,000 (ASTMD 1284). One preferred adhesive is a polyamide adhesive sold by Bostik under the trade name HM4231. This adhesive is a dimer acid based polyamide adhesive formed with piperazine and has a melt index of about 400 at 175° C. (2150 gm) and a melt viscosity at 200° C. of 3500 CPS. Further, this has an application temperature of 135–140° C. This adhesive has a molecular weight of about 10–15,000. Another suitable dimer polyamide adhesive is sold by EMS under the brand name UP1612A.

The adhesive layer 12 should be thick enough to flow into the holes created by the stitches and plug them up. It should not be so thick that it flows out from the seam area. Preferably it will be 3–10 mils with 7 mils preferred.

The waterproof film layer 14 is preferably a thin, high-temperature thermoplastic film and more particularly is a high molecular weight linear saturated polyester such as polyethylene terephthalate, polypropylene terephthalate, polybutyleneterepthalate or polylcylohexane-1,4- dimethylene terepthalate. Mylar brand PET is preferred. Layer 14 should be as thin as possible to allow as much heat as possible be transferred to layer 12 and further to allow it to cool down as quickly as possible. Layer 14 must be thick enough to prevent the stitching 38 from passing through when run through a press at elevated temperatures. Generally the layer 14 will be from about 0.1 up to about 2 mils in thickness and preferably at about 0.25 to about 1 mil thick with about 0.25 mil preferred.

Alternately the layer 14 can be a layer of polytetrafluoroethylene as described in Reaney U.S. Pat. No. 5,162,149. Preferably the PTFE layer is an expanded porous PTFE layer of from 1.0 to 2.5 mils.

FIG. 2 shows the seam tape with an optional fabric layer 18 which is simply bonded to the polyester layer 14 by a fabric adhesive layer 22. Adhesive layer 22 can be a wide variety of different adhesives. It should not melt at a temperature lower than the melting temperature of the adhesive layer 12. A preferred adhesive is Bostik brand 7650 which is a two-part adhesive. Again the nylon tricot layer is for aesthetic purposes and is not required in the present invention as the polyester layer 14 provides adequate strength to the seam tape.

The seam tape of the present invention is formed by laminating the adhesive layer onto the polyester layer 14 using heat and pressure. This is cut into the desired width and rolled. If the nylon tricot layer 18 is applied this can also be laminated to the polyester 14 either sequentially or concurrently with the application of the adhesive layer 12.

The seam tape of the present invention provides a waterproof seal about a seam. Further, it sets much more quickly than prior seam tapes, but does not cost more. Thus due to the construction of the present invention, seams can be covered with a waterproof seam tape much more quickly than with prior art seam tapes reducing the cost of manufacturing waterproof garments and tents.

A crossover seam is formed in the same manner as a simple seam as shown in the figure. The seam layer is applied over a first seam. Seam tape is then applied to a seam which intersects the first As it is applied, the seam tape crosses over the first seam tape. With prior art tapes one would separately apply heat and pressure to the crossover area after the second tape had been applied. However, with the tape of the present invention, this is not only unnecessary it is undesirable.

This has been a description of the present invention along with the preferred method of practicing the present invention, however, the invention itself should only be defined by the appended claims wherein we claim:

What is claimed is:

1. A waterproof seam comprising a first edge of waterproof fabric sewn together to a second edge of waterproof fabric along a stitch line;

a seam tape adhered to said first edge of waterproof fabric and covering said stitch line by an adhesive layer bonded to said first edge and an upper waterproof film layer covering said adhesive layer wherein said adhesive layer comprises a polyamide adhesive having a melt index of at least about 200 to about 400 and wherein said waterproof film layer comprises polyethylene terephthalate having a thickness of from about 0.25 mils to less than about 2 mil.

2. The water proof seam claimed in claim 1 wherein said seam tape further comprises an outer fabric layer bonded to said polyethylene terephthalate by a second adhesive layer.

3. The seam claimed in claim 1 wherein said polyethylene terephthalate has a thickness of less than 1 mil.

* * * * *